United States Patent [19]

Lundsager et al.

[11] 4,054,702
[45] Oct. 18, 1977

[54] MONOLITH DESIGN

[75] Inventors: Christian Bent Lundsager, Ashton; Edwin M. Glocker, Glenelg, both of Md.

[73] Assignee: W. R. Grace & Co., New York, N.Y.

[21] Appl. No.: 664,333

[22] Filed: Mar. 5, 1976

[51] Int. Cl.$^2$ .................. B32B 3/30; B32B 3/22
[52] U.S. Cl. .................. 428/167; 23/288 FC; 156/89; 252/477 R; 264/56; 428/188; 428/906
[58] Field of Search .............. 428/543, 167, 188, 906; 23/288 R, 288 FC; 106/40 R, 41 R; 252/477 R, 255; 156/89; 264/43, 56

[56] References Cited

U.S. PATENT DOCUMENTS

| 3,755,204 | 8/1973 | Sergeys | 252/477 R |
|---|---|---|---|
| 3,904,551 | 9/1975 | Lundsager et al. | 252/477 R |
| 3,926,851 | 12/1975 | Sergeys | 252/455 R |
| 3,963,504 | 6/1976 | Lundsager | 264/63 |

Primary Examiner—William J. Van Balen
Assistant Examiner—P. Thibodeau
Attorney, Agent, or Firm—Mark T. Collins; Arthur P. Savage

[57] ABSTRACT

Monoliths made by joining ribbed sheet together have a tendency to collapse when the ribs of adjacent layers do not coincide. When the monolith is made by winding embossed sheet around a mandrel there will always be places where ribs do not coincide and which tend to collapse. This deficiency is minimized by using sheet with ribs having un-equal separation. Such sheet is obtained by embossing with a roll designed for this purpose, and the monoliths of this invention have unique features of channel dimensions.

2 Claims, 2 Drawing Figures

UNEQUAL SPACING OF RIB NECESSARY.

UNEQUAL SPACING OF
RIB NECESSARY.

MONOLITH DESIGN

BACKGROUND OF THE INVENTION

Ceramic monolithic structures have found utility in several areas. U.S. Pat. No. 3,926,851 to Sergeys describes a method for preparing an auto exhaust catalyst on a monolithic structure in which the ceramic monolith is prepared and coated with the inorganic oxides active for auto exhaust gas conversion. U.S. Pat. No. 3,854,186 to Sergeys describes a method of preparing a ceramic monolithic heat exchanger.

U.S. application Ser. No. 536,079 to Lundsager filed Dec. 24, 1974, now U.S. Pat. No. 3,963,504 describes a method of preparing these monolithic structures. Very broadly, this method comprises preparing a thermoplastic material containing a plasticizer and a ceramic filler, extruding the resulting mixture as a sheet and embossing ribs thereon, rolling the embossed sheet about a mandrel and heat sealing the ribs to the back of the adjacent sheet, extracting the plasticizer and heating to remove the thermoplastic material followed by sintering to convert the structure to a ceramic monolith.

BRIEF DESCRIPTION OF THE INVENTION

We have found that any tendency of the monolithic structure prepared according to the method described in co-pending application Ser. No. 536,079 to collapse can be avoided if the ribs impressed on the thermoplastic material are spaced apart by varying distances. The distance between the sheets is kept constant by insuring all the ribs are the same height. The distance from rib to rib is variable, however.

When a sheet of a total thickness t is wound the increase in the length of sheet required for each consecutive turn is $$2 \pi (r + t) - 2 \pi r = 2 \pi t,$$

where $r$ is the radius of the completed piece at that point and $t$ is the thickness of the sheet. If the length of the repeat pattern of varying rib distances is greater than this increase, it is impossible to have a situation which could result in collapse.

Since the channels most often desired are nearly square in cross section, it follows that with equal spacing of ribs, where the distance between ribs equals t, the ribs will alternating be lined up and be misaligned $2\pi$ or slightly over 6 times in a turn. The larger the monolith is, the longer therefor becomes the length of sheet which is misaligned and therefor the greater the tendency to collapse.

The repeat pattern of varying rib distances in this invention must therefor exceed $2 \pi \times t$ in order to have the maximum effect of eliminating collapse.

DETAILED DESCRIPTION OF THE INVENTION

Figure 1:
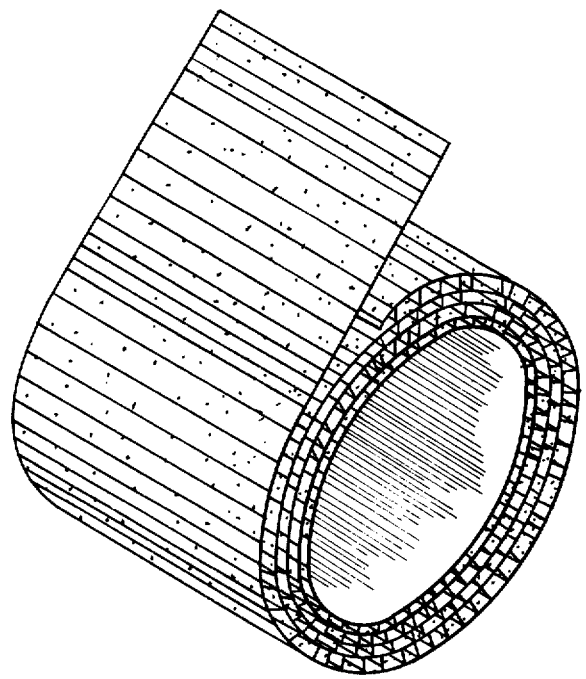

The first step of our novel process is the preparation of the mixture of thermoplastic material, inert filler and plasticizer. Although the preferred thermoplastic material is a polyolefin, other thermoplastics and blends of thermoplastics with elastomers also give satisfactory results. The thermoplastic is mixed with a ceramic filler. The type of ceramic filler used of course depends on the final use of the ceramic monolith. Examples of suitable fillers include: (a) metal oxides and hydroxides, especially those of silicon and aluminum such as gamma alumina, (b) metal silicates and aluminates; naturally occuring clays, mica, etc. precipitated silicates, synthetic zeolites, etc.

More specifically the fillers which are preferred include mullite (3 $Al_2O_3.2\ H_2O$), synthetic mullite compositions, zircon mullite, spinel and cordierite (2 $MgO.Al_2O_3.5\ SiO_2$).

The term "plasticizer" is intended to define a material which performs five functions. First, the addition of the plasticizer will improve the processability of the composition. Second, to improve the flexibility of the interim plastic composition. Third, to produce a final porosity in the composition. Fourth, to increase the viscosity of the material when the plasticizer is eventually removed and fifth, to impart a porosity to the material which facilitates escape of the gaseous products which are produced when the thermoplastic material is heated and burned off. Examples of suitable plasticizers include a. chlorinated hydrocarbons b. miscellaneous plasticizers - sulfonamide, coumarone-indene, asphalt, etc.

c. hydrocarbons-paraffin oil, low polymers such as polyisobutylene and polybutadiene d. glycols, glycol ethers and esters e. glycerin, glycerol monoacetate, etc.

f. diethylene glycol, diethylene glycol ethers and esters, triethylene glycol, etc.

g. polyethylene glycols h. propylene glycol, dipropylene glycol i. polypropylene glycol j. trimethylene glycol k. alkyl phosphates l. water soluble polymeric materials, such as polyvinylalcohols, partially hydrolyzed polyvinyl acetate, polyacrylic acid and polyvinyl pyrrolidone.

In the next step of the process the compositions are premixed at room temperature in a suitable mixture such as "dough mixer". However, in some cases the ceramic and plasticizer may be slurried together at room temperature with a volatile solvent which is evaporated before the materials are combined with the thermoplastic material. A suitable method of preparing this mixture, when the thermoplastic is a polyolefin, consists of adding the polyolefin to a mixing chamber which is preheated to 180° C. When the polyolefin fluxes, the filler and plasticizer are added slowly. The composition is then double compounded by mixing in a Plastograph or other device that gives very intensive mixing. Alternately, all raw materials can be added simultaneously to a hot intensive mixer and compounded. The final product blends can vary in overall composition according to the desired porosity of the final product. It has been determined that the greater the overall surface area of the filler the more plasticizer can be incorporated therein.

The relative proportions of the ingredients can vary greatly depending on both the desired physical properties of the intermediate product and the final product. The components are generally present in the following amounts: thermoplastic — 5 to 67% by volume, plasticizer — 15 to 80% by volume and filler 15 -80% by volume or on a weight basis: thermoplastic — 5 to 70% by weight, plasticizer — 10 to 70% by weight and filler 20 to 85% by weight. When the thermoplastic material is a polyolefin the preferred ranges are: polyolefin 5 to 50% by volume, plasticizer — 20 to 60% by volume and filler 20 to 50% by volume.

In the next step of the process the thermoplasticfiller-plasticizer blends are extruded into a sheet typically 60 cm. wide and 0.8 millimeters thick. The extruder is operated at a temperature of 150° to 200° C. The hot sheet is quite soft and enters into a three-roll take off in which the center embossing roll has axial slots of unequal separation machined into the surface. The pressure from the top roll causes the molten sheet to flow into the slots thus forming a ribbed sheet. The embossing roll is maintained below the melting point of the plastic and cools the sheets sufficiently to allow it to be stripped from the embossing roll and cooled further by the bottom roll. The pattern on the embossing on the center roll may be random, arithmetic or geometric progression. The embossing roll is maintained below the melting point of the plastic and cools the sheet sufficiently to allow it to be stripped from the embossing roll and cooled further by the bottom roll.

In the next step of the process the sheet is wound about a mandrel and heat sealed. This heat sealing is accomplished by heating to temperatures of 150° to 250° C., preferably about 200° C. and may be accomplished, for example, by directing a hot gas onto the surfaces of the material to be joined. This fuses the structure in a self-supporting shape that is retained during the subsequent steps of the process.

Following fusion the plasticizer is extracted. This may be accomplished by using any solvent in which the plasticizer is soluble. When the plasticizer is mineral oil, for example, hexane is a suitable solvent or when water soluble plasticizer such as diethylene glycol is used water is a suitable solvent. The removal of the plasticizer results in the formation of a microporous structure with sufficient thermal stability to prevent distortion during firing. In addition to providing greater surface area, extraction of the plasticizer prior to the burn off of the thermoplastic is of great value since the formation of the micropores facilitates escape of the gaseous products which are formed when the thermoplastic materials are burned off.

In the process such as described in co-pending application Ser. No. 536,079 referred to previously and other processes of this same type there is, on occasion, a tendency for the structure to collapse in the heat sealing step. The process of our invention has eliminated this tendency.

After the plasticizer has been extracted the structure is heated to the degradation temperature of the thermoplastic. The degradation temperature of course will vary with the choice of thermoplastic. When the thermoplastic material is a polyolefin, for example, a temperature range of 240° to 260° C. is preferred to initiate this degradation. At the temperature of about 240° C. (when polyethylene is the thermoplastic) the structure begins to turn black and at about 700° C. the structure begins to turn white (if the filler is alumina) indicating that the thermoplastic has been entirely burned off. When the thermoplastic is completely burned off the temperature is increased to that in which a particular powder sinters into a monolithic structure still retaining microporosity. The sintering is carried out at a temperature of about 1300° to 1450° C. and the structure is held at the sintering point for about 2 hours and allowed to cool slowly. The cooling time is generally about 3 to 4 hours.

Figure 2:
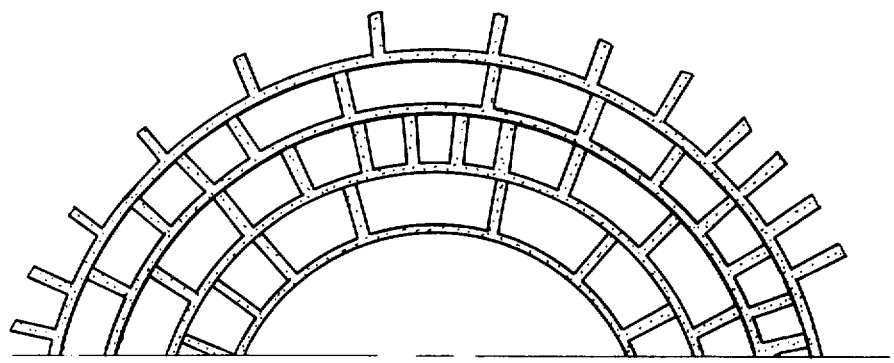

The essence of the invention is shown in FIGURES FIG. 1 shows a sheet of the material in the wound up position whereas FIG. 2 shows a crosssection of a portion of a typical monolithic structure and emphasizes the spacing of the ribs which is the essence of our invention.

Our invention is illustrated by the following specific but non-limiting examples.

EXAMPLE 1

An alumina filled polyethylene composition containing the following components, 8% by weight of particle form linear polyethylene having a melt index of 0, 70% by weight of gamma alumina and 22% by weight of mineral oil (commercially available as "Shellflex 411") was prepared by compounding the raw material in a Banbury intensive mixer at 170° C.

The composition was then extruded into a sheet 60 cm. wide and 0.8 mm. thick. The extrusion was carried out at a temperature of 150°-200° C. The sheet was passed through a roll that had slot distances of 2.0225, 2.050, 2.100, 2.175, 2.275, 2.400, 2.550, 2.725, 2.925 and 3.150 mm. A center roll with 13 cycles of this pattern around a 100 mm. diameter was used. The resulting sheet was wound about a mandrel to form a honeycomb-like cylinder. The sheet was heated during this winding operation to a temperature of about 200° C. to assure heat sealing of the structure. This was accomplished by directing hot gases at the surfaces of the sheets to be joined.

The cylinder was then cooled and immersed in hexane for 30 minutes to extract substantially all of the mineral oil. It was then dried and heated in a furnace in an reducing atmosphere first to about 250° C. over a period of two hours. When degradation began as was evidenced by the black color of the structure the temperature was slowly increased and about 2 hours later and at about 700° C. the structure turned white indicating the burn off of the polyethylene was complete. The temperature was then slowly increased and about 2 hours later reached 1450° C. where it was held for about 2 to 4 hours to sinter the remaining ceramic powder. The structure was cooled slowly over a period of about 4 hours and the monolith recovered. There was no evidence of any collapse of the monolithic structure during the process.

What is claimed is:

1. In an improved ceramic monolith structure prepared by winding successive layers of a rib embossed sheet to provide a structure having channels along the length thereof, said channels having essentially the same dimension in a direction perpendicular to the axis of winding, and subsequently treating said sheet to form a ceramic structure, the improvement comprising embossing said sheet with a repeating pattern in which the dimension from rib to adjacent rib is unequal and which has a repeating length which is greater than $2\pi$ times the thickness of the layers of the embossed sheet.

2. The ceramic monolith acording to claim 1 wherein the repeating pattern is a random pattern.

* * * * *